J. M. LINDSEY.
HORSE DETACHER.
APPLICATION FILED SEPT. 30, 1910.
994,172.
Patented June 6, 1911.
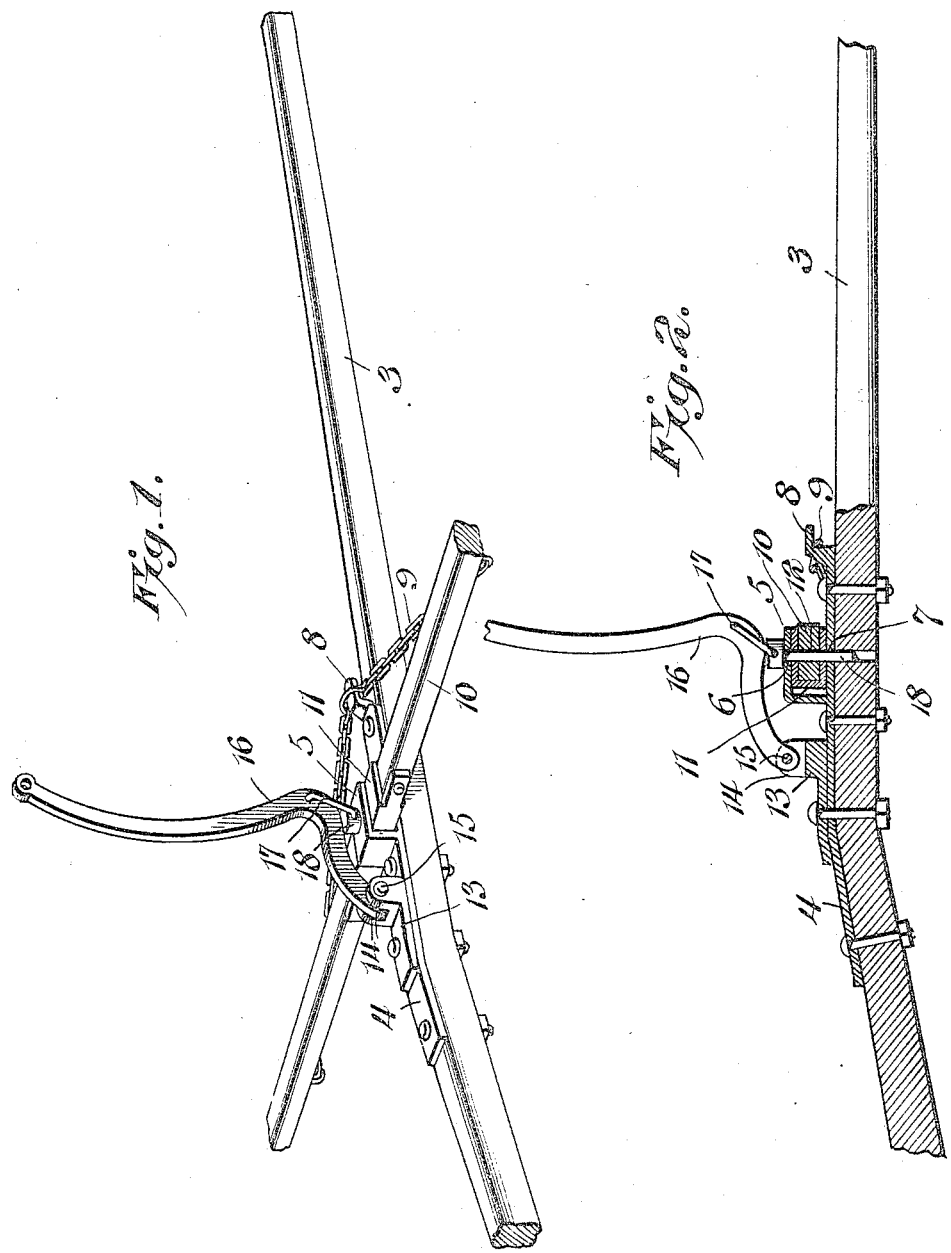
WITNESSES
J. M. Lindsey, INVENTOR,
BY
ATTORNEY

UNITED STATES PATENT OFFICE.

JOHN M. LINDSEY, OF CALL, TEXAS.

HORSE-DETACHER.

994,172.

Specification of Letters Patent.   Patented June 6, 1911.

Application filed September 30, 1910.   Serial No. 584,728.

*To all whom it may concern:*

Be it known that I, JOHN M. LINDSEY, a citizen of the United States, residing at Call, in the county of Newton and State of Texas, have invented a new and useful Horse-Detacher, of which the following is a specification.

My invention relates to horse detachers, and particularly to that class of such devices wherein the horse or horses may be detached from the vehicle by the driver while seated in the vehicle.

One of the objects of my invention is to provide a means whereby the horse if frightened, running away, stalled in a stream or balky in front of a rapidly moving train may be easily and quickly detached from the vehicle and thus save the vehicle or occupants from a possible injury.

Another object is to provide a device of this character wherein the bolt holding the tree in place is prevented from jarring out of position by the operating lever normally acting upon the head of the bolt.

A further object is to provide a means whereby stay chains may be used in connection with the tree, and when the bolt is pulled or the horse released, the chains will be automatically disengaged from the hook by which they are held.

To the accomplishment of these objects, the invention consists in certain novel combinations, construction and arrangement of parts, the details of which will appear in the course of the following description, in which reference is had to the accompanying drawings, forming a part of this specification, like characters of reference designating similar parts throughout the several views, wherein:—

Figure 1 is a perspective view showing my device applied to a vehicle tongue. Fig. 2 is a horizontal sectional view showing the arrangement of the lever and pin.

In the drawings, 3 represents a tongue, pole, or other support which is adapted to be secured to a vehicle in any suitable manner. The invention may, however, be applied to the cross-bar of a pair of shafts.

Secured to the upper side of the tongue and extending longitudinally thereof, is a plate 4 of approximately the same width as the tongue, said plate having near its front end an integral upstanding rectangular arm 5, the top portion of which is parallel with said plate, and is provided with a bolt opening 6, which is in alinement with a corresponding opening 7 in said plate. The extreme front end of the plate 4 terminates in an upstanding forwardly projecting hook 8 which is adapted to engage one of the links of a stay chain 9, the ends of which are connected to doubletree 10, at points midway thereof, said tree being pivotally mounted between the overhanging arm 5 and plate 4. The chain limits the swing of the tree and is of such a length as to prevent the contact of the upstanding portion of arm 5 with reinforcing plate 11. The tree 10 is provided with a reinforcing plate 11 through which is formed a bolt opening 12, which, when the tree is in position, is in alinement with the bolt openings 6 and 7.

Attached to the top of the plate 4 and arranged immediately in the rear of the overhanging arm 5 is a bearing block 13 provided at its front end with parallel upstanding ears 14, between which, by means of a pin 15, is pivotally mounted a bell crank lever 16. The said lever terminates in an upstanding handle or operating portion, which, when the tongue is in position on the vehicle, is immediately in front of the dash board and in convenient reach of the driver.

Pivotally connected to lever 16, as by a link 17, is a pin 18, which serves to hold the tree 10 in position between arm 5 and plate 4. It will be noticed that the entire weight of the bell crank lever 16 rests on the head of the pin 17, thus preventing said pin from jarring out of position. The lever 16 is further provided at its top with an opening in which may be secured a cord or rope extending from the vehicle, said rope providing additional means for operating the lever 16.

The operation of the device is as follows:—Should a driver desire to release a runaway horse, it is only necessary for him to reach over the dash and pull the bell crank lever rearwardly. He may do this by hand or by pressing the handle of the lever rearwardly with the handle of the whip. This will raise the pin, and the tree will become disconnected from the pole, and as the tree advances along the pole, the stay chain will be disconnected from its supporting hook and the horse will be permitted to go as it pleases. The purpose of using the said chain will be manifest when it is explained that if the said chain were omitted, the tree could swing on its pivot to an unlimited extent, and in its free swing from one extreme to another, it would cause the parts to bind and make the device inoperative. The said chain is a necessary feature of this invention, and because of its use provision must be made to allow for its disconnection when the releasing bolt 18 is withdrawn. Such provision is made by the hook 8, which constitutes a fixed part, passing through one of the links at the forward portion of the chain.

By the term "support" used in the claim, I wish it to be understood as comprehending therein the pole 3 or the cross-bar connecting a pair of shafts.

From the foregoing description it will be seen that simple and efficient means are provided for accomplishing the objects of the invention, but while the elements herein shown and described are well adapted to serve the functions set forth, it is obvious that various minor changes may be made in the proportion, shape and arrangement of the several parts, without departing from the spirit and scope of the invention as defined in the appended claim.

I claim:—

In a horse detacher, the combination of a support, a tree, a vertically-disposed bolt for connecting the tree to the support, an operating lever connected to said bolt for releasing the same from the tree and the support, a stay chain connected to the tree and extending forwardly therefrom, and a rigid hook mounted on the support in advance of the tree, said hook projecting forwardly and adapted to engage one of the links of the chain, whereby upon the release of the tree from the bolt, the stay chain is carried by the tree out of engagement with said hook.

In testimony that I claim the foregoing as my own, I have hereto affixed my signature in the presence of two witnesses.

JOHN M. LINDSEY.

Witnesses:
W. T. HOOKER,
W. N. HOLBROOK.